United States Patent [19]

Reeves

[11] Patent Number: 4,682,715
[45] Date of Patent: Jul. 28, 1987

[54] DETACHABLE SHOE-LURE DISPENSER

[76] Inventor: Richard R. Reeves, Star Rte. 1, Box 36A, Kinder, La. 70648

[21] Appl. No.: 888,520

[22] Filed: Jul. 23, 1986

[51] Int. Cl.$^4$ .................... B67D 5/64; A01M 00/00
[52] U.S. Cl. .................... 222/175; 239/153; 239/379; 401/6; 401/195; 43/1
[58] Field of Search ................ 239/152-153, 239/145, 302, 379; 47/1.5, 81; 43/1; 222/175, 478-479; 224/222, 267; 36/72 B, 132, 136; 401/6, 198, 195, 199, 203, 204; 285/91, 370, 397, 404

[56] References Cited

U.S. PATENT DOCUMENTS

| | | | |
|---|---|---|---|
| 958,277 | 5/1910 | Phinny | 36/136 X |
| 2,000,481 | 5/1935 | Harrison | 285/397 X |
| 3,021,642 | 2/1962 | Ewing | 239/145 X |
| 3,359,591 | 12/1967 | McGuire | 401/203 |
| 3,362,775 | 1/1968 | Muecke | 401/6 |
| 4,082,467 | 4/1978 | Kaplan | 401/199 |
| 4,186,502 | 2/1980 | Foster | 36/136 |
| 4,302,899 | 12/1981 | DeHart | 43/1 |
| 4,506,806 | 3/1985 | Lincoln et al. | 222/175 |
| 4,609,245 | 9/1986 | Sakschek | 239/36 |

FOREIGN PATENT DOCUMENTS 855405 11/1970 Canada .................... 401/6

Primary Examiner—Joseph J. Rolla
Assistant Examiner—Michael S. Huppert

[57] ABSTRACT

A detachable shoe accessory for dispensing lure directly onto the ground for attracting animals or camouflaging one's own scent. It consists of a container from which deer lure or other scent camouflaging liquid is gradually dispensed onto an elongated, flexible, absorbent applicator, which is drug along the ground during walking activity, thereby leaving a scented trail along one's path.

5 Claims, 4 Drawing Figures

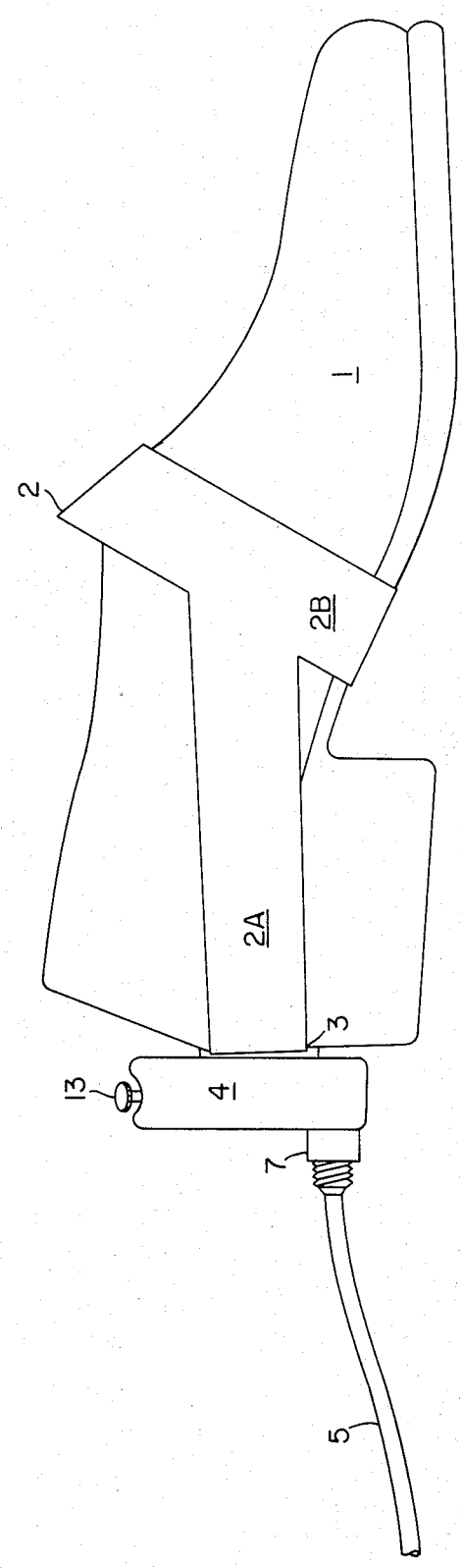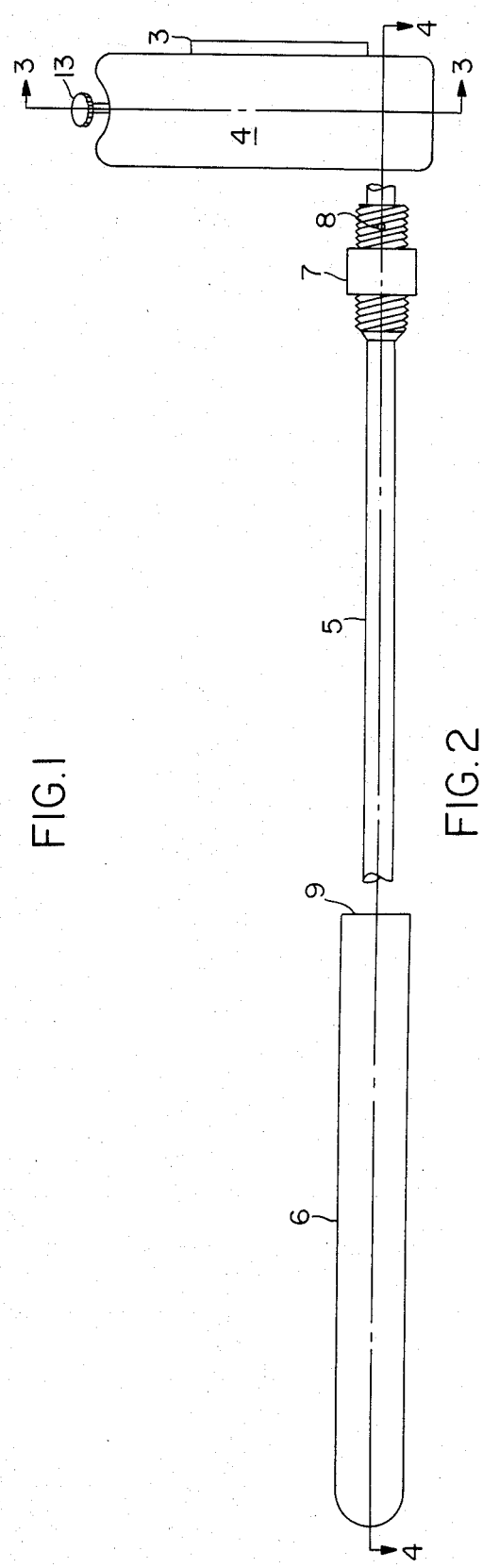

DETACHABLE SHOE-LURE DISPENSER

BACKGROUND OF THE INVENTION

This invention relates to hunting or trapping accessories and more particularly to a detachable shoe accessory in the form of a hunter's or trapper's detachable shoe-lure dispenser.

It is an important requirement by naturalists, trappers and hunters to be able to dispense lure directly onto the ground to better conceal their own scent trails and particularly by hunters, to attract animals. Because such individuals must be able to move about, it is desirable that the dispensing means be associated with the person of the hunter or trapper, rather than, e.g., consisting of scented baits located about a limited area. It is also desirable that the scent not contaminate the person or clothing of the individual, e.g., by coming into contact with or being applied to the individual's clothing. It is further desirable that the apparatus be capable of controling flow so as to gradually dispense fresh lure rather than become ineffective with time as in the case of scent pads.

SUMMARY OF THE INVENTION

The principle object of this invention is to provide a hunter's and trapper's scent dispensing apparatus, which will be such structure, that it will apply a minute, but continous, amount of scented liquid, e.g., deer lure, directly to the ground for use by trappers and hunters to better conceal their own scent trail and particularly by hunters, to attract animals towards them.

Further important objects are to provide a device that is attached to the heel of the shoe by a harness employing an elastic strap making it very quick and easy to put on and take off, that is versatile and not constrained to use with any particular type or size of footwear.

Still further objects are to provide such a device whereby the flow of lure can be shut off and the apparatus removed and easily stored by covering the flexible, absorbent applicator with a removable, tubular sheath or cover.

The invention, in more detail, provides a detachable, shoe mounted dispenser of animal lure comprising a container from which a regulated flow of scented liquid saturates a length of flexible, absorbent material. The flow of liquid is actuated by gravity and motion form walking activity. Shaking of the dispenser during walking assists in gradually relieving the vacuum in the container caused by the outward gravitational flow of the liquid from the container. The vacuum can be relieved more quickly by pressing the air vent buttor on the filler cap. Flow of the liquid onto the flexible, absorbent applicator is regulated through an adjustable needle valve.

BRIEF DESCRIPTION OF THE DRAWINGS

FIG. 1 is a side view of the invention attached to a shoe and with the tubular storage cover removed.

FIG. 2 is an exploded side view of the invention with the harness removed.

DETAILED DESCRIPTION

Figure 3:
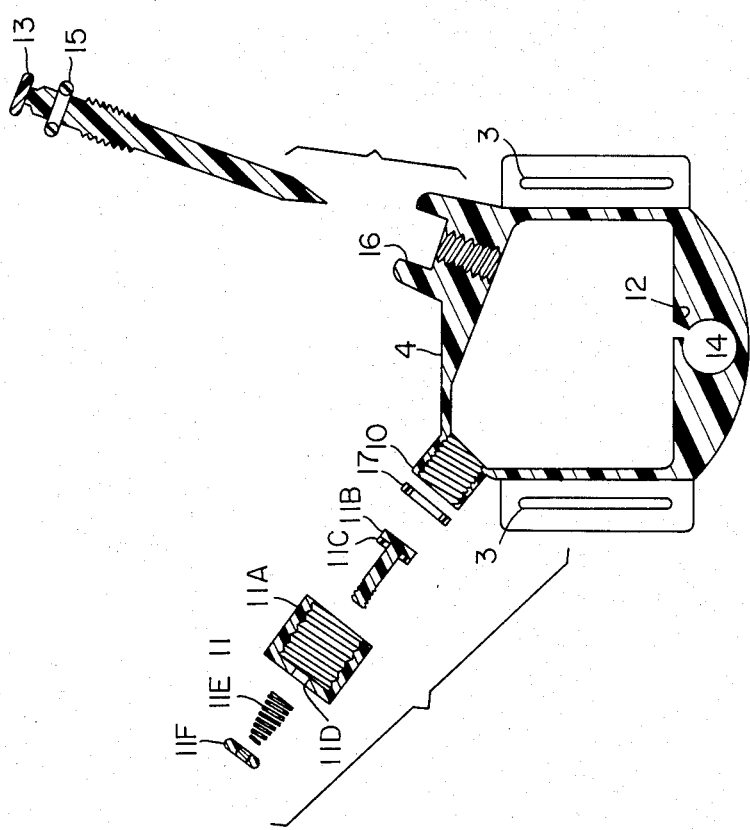
FIG. 3 is an exploded cross sectional view of the container, needle valve and removable air vent.

FIG. 1 shows the invention in operating mode and attached to a typical shoe 1. Attachment to a shoe 1 is accomplished by the elastic harness 2 which is comprised to two straps 2A and 2B. Strap 2A, which passes through slotted wings 3 extending along the front and on each side of the container 4 and strap 2B, which encircles the arch of the shoe 1.

FIG. 2 shows that connection between the container 4, the elongated, flexible, absorbent applicator 5 and the removable, tubular storage cover 6 is accomplished by the applicator connector 7, The applicator connector 7 serves as conduit for the lure from the container 4 to the said applicator 5. The applicator connector 7 also serves as a connecting device for attaching the said applicator 5 by means of a pin 8. Male threads on each end of the applicator connector 7 serve as a means for attaching to the container 4 and for attaching the removable tubular storage cover 6.

The removable, tubular, storage cover 6 has female threads on the inside surface of one end 9, which attaches to the applicator connector 7 during non-use periods.

FIG. 3 shows that filling of the container 4 is accomplished through the molded opening 10 in the container 4. Said molded opening 10 is threaded male to receive the removable air vent 11, which in turn is threaded female for this union. Rubber washer 17 forms a seal between Cap 11A and molded container opening 10 when cap 11A is in on position. The removable air vent 11 is comprised of a cap 11A, through which the air vent shaft 11B passes. The air vent shaft 11B also serves as a seat for the rubber washer 11C, which seals off the cap shaft hole 11D due to pressure exerted by spring 11E. The air vent button 11F is threaded female to screw onto the end of the air vent shaft 11B, which is threaded male for this union. The air vent shaft 11B also acts as a seat against which the spring 11E pushes. The position of the air vent button 11F can be adjusted on the air vent shaft 11B to apply proper compression to spring 11E. This will allow washer 11C to open thereby relieving vacuum in container 4 caused by outward, gravitational flow of lure. Shaking of the dispenser during walking assists in gradually relieving the said vacuum in the container 4. Pressing the air vent buttor 11F relieves vacuum within the container and allows faster flow of lure through needle valve seat 12. Faster flow of the lure is advantageous during initial saturation of the elongated, flexible, absorbent applicator 5. Rubber washer 17 acts as a seal between the cap 11A and the molded opening 10 in the container 4.

By turning the needle valve stem 13 a controlled flow of lure is allowed to pass through the needle valve seat 12 into the chamber 14. Said chamber 14 is threaded female to receive the applicator connector 7. A rubber "O" ring 15 is seated on the needle valve stem 13 and acts to form a seal between the said valve stem 13 and the molded container seat 16.

Figure 4:
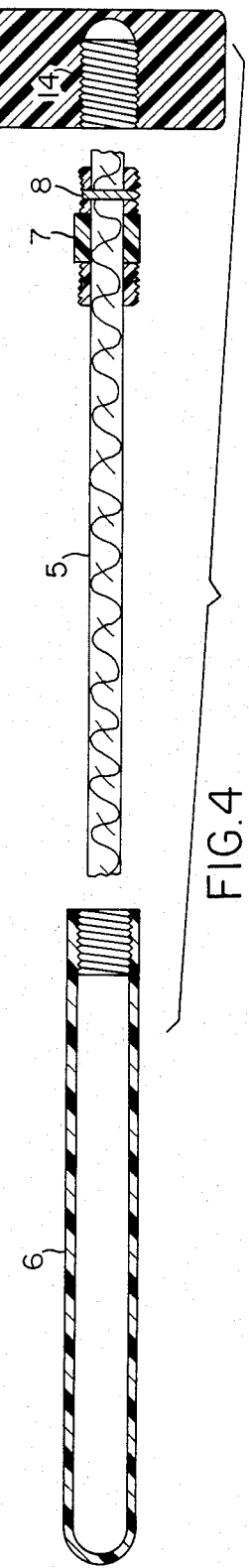
FIG. 4 is a top exploded cross sectional view of the removable storage cover, elongated, flexible, absorbent applicator, applicator connector and container.

FIG. 4 better shows the manner of connection between the container 4, the applicator connector 7 and the removeable tubular storage cover 6.

In use, the hunter or trapper removes the air vent 11 and places 1 and 1½ ounces of lure in the container 4. The air vent 11 is replaced, the tubular storage cover 6 is removed and the accessory is attached to the heel of one's shoe 1 by the use of the elastic harness 2. The needle valve stem 13 is opened to a predescribed setting.

For initial saturation of the elongated, flexible, absorbent applicator 5, the air vent button 11F is depressed until said applicator 5 is satisfactorily wetted. The continuous minute flow of the liquid is actuated by gravity and motion from walking. Shaking of the dispenser during walking assists the air vent 11 in gradually relieving the vacuum in the container 4 caused by the outward flow of the liquid. Adjustments may be made to the air vent button 11F and the needle valve stem 13 to better control the the flow of lure onto the said applicator 5.

What is claimed and desired to be protected by U.S. Letters Patent is:

1. A detachable shoe accessary for dispensing animal lure directly onto the ground during walking activities comprising; a container for housing animal lure, said container having a means for regulating the flow of lure onto an elongated, flexible, absorbent applicator, said container molded so as to fit the heel of a shoe and constructed so as to provide a slotted wing extending along the front and on each side of the container through which the harness for attaching the container to the shoe is placed, said container also having a threaded female connector molded in the bottom and rear for attaching the applicator connector; a harness for attaching the accessory to the heel of a shoe, said harness being formed by straps made of elastic material; an elongated, flexible, absorbent applicator capable of communicating the minute amount of lure released from the container directly onto the ground during walking activities; an applicator connector, being a conduit having male threads for attaching to the container on one end and having male threads for attaching to the removable, tubular, storage cover on the other end, said applicator connector shaped so as to secure one end of the elongated, flexible, absorbent applicator by the insertion and a pin; and a removable, tubular cover or sheath of a size and shape to encase the said applicator during storage or non-use.

2. A shoe accessory as recited in claim 1, wherein the said means for regulating the flow of lure is by a needle valve.

3. A shoe accessory as recited in claim 2, wherein the needle valve includes a stem head which protrudes from the container to render it easily accessable.

4. A shoe accessory as recited in claim 1, further comprising an air vent for said container.

5. A shoe accessory as recited in claim 4, wherein said air vent is removable so as to also serve as a filler cap for replenishing lure supply in the container.

* * * * *